US011622067B2

(12) United States Patent
Tan et al.

(10) Patent No.: US 11,622,067 B2
(45) Date of Patent: Apr. 4, 2023

(54) CONNECTED BATHROOM COMPONENTS

(71) Applicant: Kohler Co., Kohler, WI (US)

(72) Inventors: Luncheak Tan, Shanghai (CN); Chinghua Chen, Shanghai (CN)

(73) Assignee: Kohler Co., Kohler, WI (US)

( * ) Notice: Subject to any disclaimer, the term of this patent is extended or adjusted under 35 U.S.C. 154(b) by 34 days.

(21) Appl. No.: 16/425,489

(22) Filed: May 29, 2019

(65) Prior Publication Data

US 2019/0373152 A1 Dec. 5, 2019

(30) Foreign Application Priority Data

May 31, 2018 (CN) .......................... 201810552984.2
May 31, 2018 (CN) .......................... 201820839707.5

(51) Int. Cl.
*H04N 5/225* (2006.01)
*G06F 3/048* (2013.01)
*G03B 9/08* (2021.01)
*G06F 3/0488* (2022.01)
*A47G 1/02* (2006.01)

(52) U.S. Cl.
CPC ............. *H04N 5/2257* (2013.01); *A47G 1/02* (2013.01); *G03B 9/08* (2013.01); *G06F 3/0488* (2013.01)

(58) Field of Classification Search
CPC ........ H04W 4/008; G06T 2207/30196–30201; H01R 39/643; H05K 5/00–069; B60R 11/04; H04N 5/2253; H04N 5/23206
USPC ....................................................... 396/56–59
See application file for complete search history.

(56) References Cited

U.S. PATENT DOCUMENTS

| 9,934,366 | B1 * | 4/2018 | Zanuzoski | .......... G06F 19/3462 |
| 2002/0007510 | A1 * | 1/2002 | Mann | ...................... E03C 1/057 |
| | | | | 4/300 |
| 2008/0172634 | A1 * | 7/2008 | Choi | ...................... G06F 1/1626 |
| | | | | 715/822 |
| 2014/0053189 | A1 * | 2/2014 | Lee | .................... H04N 21/4751 |
| | | | | 725/37 |
| 2017/0111561 | A1 | 4/2017 | Chen | |
| 2018/0013934 | A1 * | 1/2018 | Germe | ................. H04N 5/2252 |

(Continued)

FOREIGN PATENT DOCUMENTS

| CN | 204650264 | 9/2015 |
| CN | 106200402 | 12/2016 |

(Continued)

OTHER PUBLICATIONS

Office Action from related CN 201810552984.2 dated Aug. 5, 2020.

(Continued)

*Primary Examiner* — Xi Wang
(74) *Attorney, Agent, or Firm* — Lempia Summerfield Katz LLC

(57) ABSTRACT

A camera system that includes a camera having a main body having a front surface and a back surface; a lens disposed within the main body and configured to view objects in front of the front surface; a magnet coupled to the back surface, wherein the magnet is configured to removably couple the camera to a ferromagnetic material; a shutter adjustably coupled to the main body, so that the shutter is moveable relative to the lens between a closed position and an open position; and a controller disposed within the main body and configured to control operation of the camera.

20 Claims, 7 Drawing Sheets

(56) References Cited

U.S. PATENT DOCUMENTS

| | | | |
|---|---|---|---|
| 2018/0032227 A1* | 2/2018 | Broxson | G06F 3/0488 |
| 2018/0131794 A1* | 5/2018 | Holder | H04M 1/11 |
| 2018/0270410 A1* | 9/2018 | Lyle | H04N 7/183 |
| 2019/0041603 A1* | 2/2019 | Richter | A45C 13/001 |
| 2019/0133345 A1* | 5/2019 | Franz | A47G 1/02 |
| 2020/0265756 A1* | 8/2020 | Agadzhanyan et al. | G09F 7/02 |

FOREIGN PATENT DOCUMENTS

| | | |
|---|---|---|
| CN | 205847389 | 12/2016 |
| CN | 206443436 | 8/2017 |
| CN | 107280350 | 10/2017 |
| CN | 207234850 U | 4/2018 |
| CN | 207246715 U | 4/2018 |
| CN | 207357629 | 5/2018 |

OTHER PUBLICATIONS

Chinese Office Action on CN Patent Application No. 2018105529842 dated Mar. 16, 2021.
Third Office Action, dated Aug. 5, 2021, issued in corresponding Chinese Patent Application No. 201810552984.2 (13 pages).
Fourth Chinese Office Action on CN Appl. Ser. No. 201810552984.2 dated Nov. 25, 2021 (11 pages).

\* cited by examiner

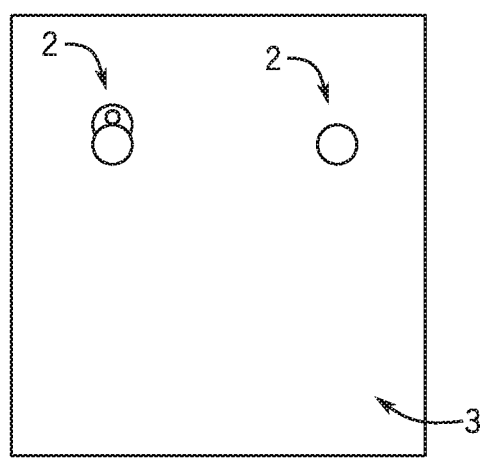
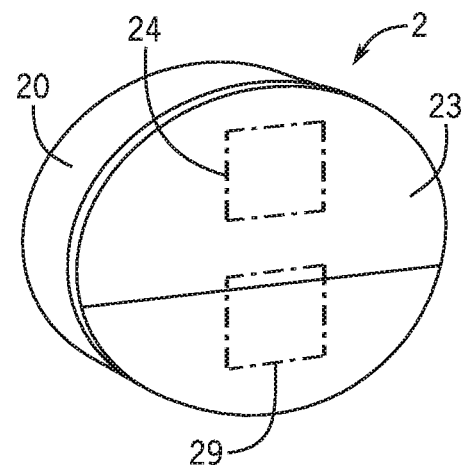
FIG. 3
FIG. 4
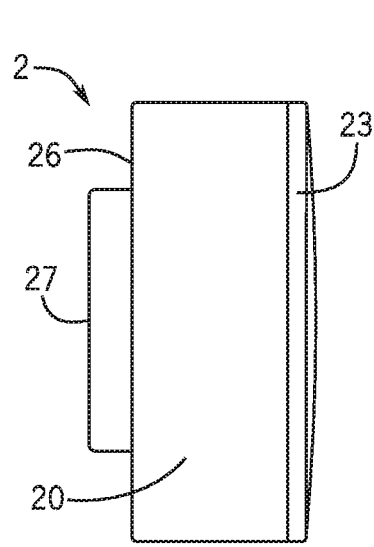
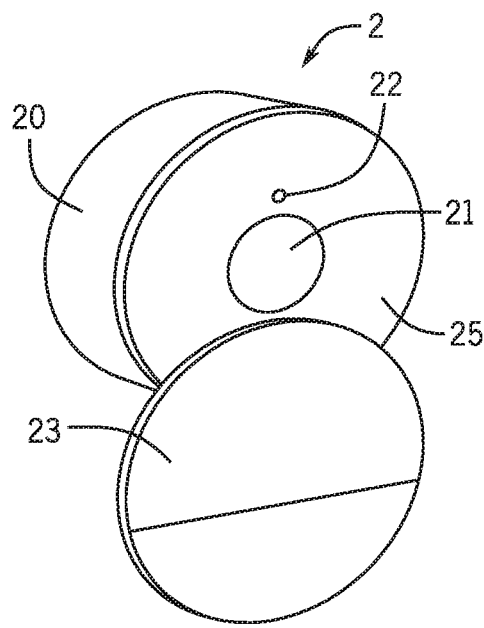
FIG. 5
FIG. 6

CONNECTED BATHROOM COMPONENTS

CROSS REFERENCE TO RELATED APPLICATIONS

This application claims priority to and the benefit of Chinese Priority Application Nos. 201810552984.2 and 201820839707.5, both of which were filed on May 31, 2018. The entire disclosures of the foregoing applications, including the specifications, drawings, claims and abstracts, are incorporated herein by reference in their entireties.

TECHNICAL FIELD

The present application relates generally to the field of bathroom devices or appliances. More specifically, this application relates to intelligent bathroom devices that provide functions to a user based on user input or settings. This application further relates to a wireless magnetic camera that a user can interact with wirelessly through a mobile application.

BACKGROUND

There is need to provide communication and control over intelligent bathroom devices with wireless devices and/or mobile applications.

SUMMARY

At least one embodiment of this application relates to a system of bathroom appliances for providing services according to user identity. The system includes a first appliance, a server, and a second appliance. The first appliance is configured to collect sensor data associated with an identity of a user. The server is configured to receive the sensor data from the first appliance and analyze the sensor data to determine the identity of the user. The second appliance is configured to provide a device function to the user based on the identity determined from the sensor data collected by the first appliance.

At least one embodiment of this application relates to a communication system for providing feedback data for at least one water consuming device. The communication system includes a data collection interface, a controller, and an output interface. The data collection interface is configured to receive user data from at least one collection device. The controller is configured to perform an analysis of the user data from the at least one collection device. The output interface is configured to provide feedback data based on the analysis of the user data to a water consuming device.

At least one embodiment of this application relates to a camera system that includes a camera. The camera includes a main body having a front surface and a back surface; a lens disposed within the main body and configured to view objects in front of the front surface; a magnet coupled to the back surface, wherein the magnet is configured to removably couple the camera to a ferromagnetic material; a shutter adjustably coupled to the main body, so that the shutter is moveable relative to the lens between a closed position and an open position; and a controller disposed within the main body and configured to control operation of the camera.

At least one embodiment of this application relates to an integrated mirror and camera system. The system includes a mirror and a camera. The mirror includes a structure, a mirrored door, and a ferromagnetic material. The camera includes a main body, a lens, a magnet, a shutter, and a controller. The main body has a front surface and a back surface. The lens is disposed within the main body and is configured to view objects in front of the front surface. The magnet is coupled to the back surface of the main body, so that the magnet removably couples the camera to the ferromagnetic material of the mirror. The shutter is adjustably coupled to the main body, so that the shutter is moveable relative to the main body and the lens between a closed position and an open position. The controller controls operation of the camera.

BRIEF DESCRIPTION OF THE DRAWINGS

Exemplary embodiments are described herein with reference to the following drawings.

FIG. 3 is a front view of an exemplary embodiment of a mirror and a wireless magnetic camera with a slideable shutter on the mirror.

FIG. 4 is a perspective view of the wireless magnetic camera with a slideable shutter shown in FIG. 3.

FIG. 5 is a side view of the wireless magnetic camera shown in FIG. 3 with the slideable shutter in a closed position.

FIG. 6 is a perspective view of the wireless magnetic camera shown in FIG. 3 with the slideable shutter in an open position.

DETAILED DESCRIPTION

Intelligent bathroom devices can be equipped to communicate with and be controllable by wireless devices and/or mobile applications. In this way, a user can utilize a mobile application or wireless device with a user interface to control features and settings of various appliances. For example, the mobile application can store preferred settings for a user or can retrieve information from the internet to personalize or adjust the features of various appliances. In addition, such appliances can provide added convenience and utility to a user by streamlining the flow of information between the appliance and/or mobile application and the internet.

Network of Appliances

Figure 1:
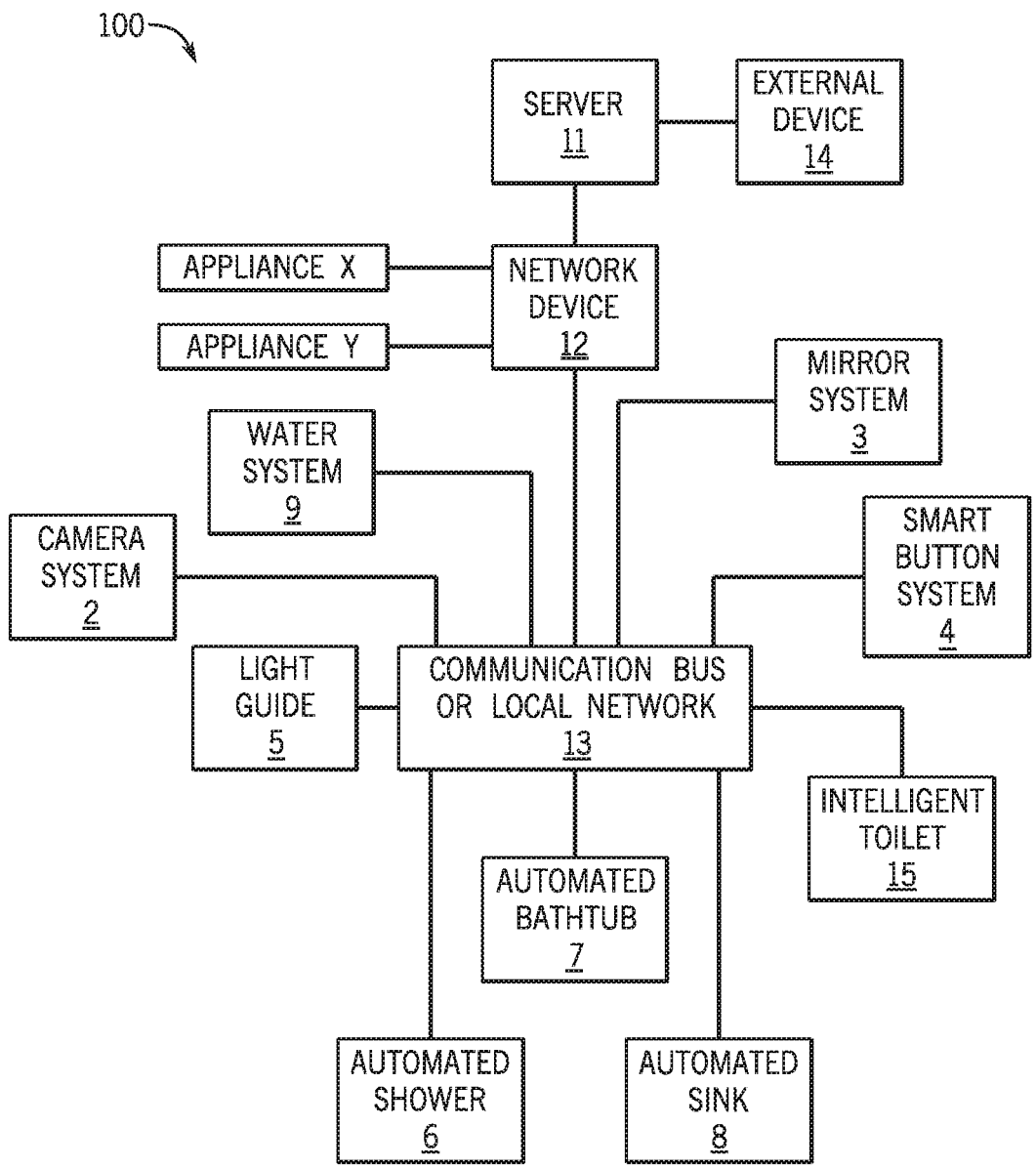
FIG. 1 is a schematic of a communication network for a bathroom having multiple appliances or intelligent bathroom devices connected through at least one home hub communication device, according to an exemplary embodiment of this application.

FIG. 1 illustrates an exemplary embodiment of a communication network 100 for a bathroom having multiple appliances or intelligent bathroom devices connected through at least one home hub communication device. The intelligent bathroom devices can include one or more of a (wireless magnetic) camera system 2, an intelligent mirror system 3, a smart button system 4, a light guide 5, an automated shower 6, an automated bathtub 7, an automated sink 8, a water system 9, and an intelligent toilet 15. Each intelligent bathroom device is configured to communicate with a mobile application and/or wireless device having a user interface in order to send and/or receive commands and/or information. The illustrated network 100 includes an external device 14, such as a smartphone or tablet, as the wireless device, although other types of devices (e.g. voice recognition devices, such as smart speakers) can be used. As discussed below, the external device 14 communicates with each intelligent bathroom device through a local network 13, a network device 12, and/or a server 11.

The camera system 2 can be removably coupled to, for example, the mirror system 3, such as through a magnet and a ferromagnetic coupling, to capture photos. In addition, a controller including a communications module enables a user to operate (e.g., control) and interact with the camera system 2 by way of, for example, a wireless device. Thus, the camera system 2 can communicate with other devices/appliances, such as the mirror system 3, through a home hub communication device.

The intelligent mirror system 3 can include a light, a controller, and a user interface. The controller may include a proximity sensor, a lighting module, and a communications module. In this way, the mirror system 3 can sense the presence of a user through the proximity sensor and adjust the lighting (e.g., illumination, luminous intensity) to a preset lighting condition. Similarly, the mirror system 3 can detect presence of an external device 14 of the user and adjust the lighting. Further, the mirror system 3 can include a light sensor, which measures the light present (e.g., ambient light) without the light associated with the mirror system 3 and adjust the luminous intensity of the light to achieve a predetermined amount of light in the bathroom. In addition, the communications module can enable the user to interact with and display features on the mirror by interfacing with, for example, a user interface on the mirror system 3 and/or a wireless device. The user can control and interact with other devices (e.g., adjust settings of the mirror system 3, 203, 303) through the user interface. For example, the user can control lighting of the lighting module through the user interface. The mirror system 3 can also include one or more wireless magnetic camera systems 2 affixed to the mirror system 3. Each camera system 2 can have, as examples, Bluetooth capability and a shutter for a user to close the lens (e.g., manually, remotely, etc.). Each camera system 2 can be removable from the mirror system 3 to be stored away when not in use or used with another object (e.g., bathroom appliance). The mirror system 3 can communicate with other devices through a home hub communication device.

The mirror system 3 can include one or more mirror substrates and/or a cabinet. The cabinet can include one or more internal shelves, a power source, and/or a magnetic surface. In at least one embodiment, the mirror has a mirror substrate on a first side and a user interface on a second side next to the first side. In at least one embodiment, the mirror has a first mirror substrate on a first side, a second mirror substrate on a second side, and a user interface disposed between the first and second mirror substrates. The user interface can include a touchscreen (e.g., capacitive touchscreen) that can receive a user input to control functionality of the mirror or to display output information.

The smart button system 4 can act as an emergency alarm/alert and can include a manual button/trigger, voice activation, and/or actuation through an external device 14. The smart button system 4 can be part of the mirror system 3 or a standalone system that communicates with the mirror system 3 or other systems/devices through the local network 13 and/or a home hub communication device.

A user can control operation and/or monitor status of the intelligent devices, such as the automated shower 6, the automated bathtub 7, the automated sink 8, the water system 9, and/or the intelligent toilet 15 through the one or more mobile applications, such as through a smartphone or other wireless smart device. For example, the mobile application(s) can control (e.g., activate/deactivate) heating (e.g., seat heater, foot heater, etc.) of the intelligent toilet 15 based on user identification, external and/or interior temperature. Also, for example, the mobile application(s) can control an automatic sanitizing/cleaning cycle (e.g., using ultraviolet light) of the intelligent toilet 15. As discussed herein, the system can record and/or learn specific user preferences and control the appliances/components of the system according to the user preferences. For example, the mobile application(s) can learn user preferences of water temperature for the automated (e.g., intelligent) shower 6 and/or bathtub 7 and can automatically fill the bathtub 7 or start the shower 6 through the mobile application(s) to the user's preferred water temperature. Similarly, for the mobile application(s) can automatically place the automated shower 6 into a specific mode of operation (e.g., specific spray pattern(s)) based on user identification, which can be different for each specific user of the shower 6. The system can learn patterns of use and non-use of each intelligent device for each day use and automatically either shut down or place into a low power consumption mode each device when in a patterned non-use time and power up the device in a patterned use time. In addition to being very ergonomic to each user, the system can save energy (e.g., power).

Additionally, the intelligent or automated devices (e.g., shower 6, bathtub 7, toilet 15, etc.) can be further integrated with sensors for monitoring status of the device to detect, for example, potential issues with the device. For example, the intelligent toilet 15 can include a sensor that monitors water usage, which can detect and notify a user through the mobile application(s) when too much consumption is occurring, such as in the event the toilet flush valve is not working properly and water passes from the tank to the bowl between flush cycles. In this way, the user can investigate and repair the toilet right away to reduce water waste. Also, for example, the automated sink 7 can include a sensor that monitors overflow level of water, such as in the event that the drain is clogged enough to retard the rate of draining water to prevent overflow of water from the sink. Further, sensors can be equipped with the plumbing to detect leaks, which can communicate directly with the mobile application(s), such as to send push notifications to the user to investigate and repair the suspected leaky plumbing. In this way, a user can monitor the status of the devices in a home remotely, such as while on vacation.

Communication Network

Returning to the communication network 100 illustrated in FIG. 1, multiple bathroom appliances, such as the intelligent camera system 2, the intelligent mirror system 3, and the smart button system 4 can communicate with one another (and other devices) through the network 100, such as the local network 13. The illustrated communication network 100 includes a server 11 and a network device 12 in addition to the communication bus or local network 13. It is noted that the network 100 can include additional, different, or fewer components than illustrated. For example, the network 100 can include any combination of the previously mentioned components, the light guide 5, the automated shower 6, the automated bathtub 7, the automated sink 8, and the water system 9.

The server 11 can be or include a cloud based device configured to communicate with multiple network devices 12 located in multiple locations (e.g., different homes or businesses). The server 11 can implement a cloud service that coordinates and analyzes data from the multiple network devices 12 affiliates with multiple appliances.

The network device 12 can be a standalone device (e.g., having a dedicated power supply, a speaker 155, and/or microphone) as a home hub communication device. Alternatively, the network device 12 can be integrated with one or more of the appliances.

In at least one embodiment, the analysis of data occurs primarily at the network device 12, which can be referred to as the local analysis embodiments. In at least one other embodiment, the analysis of data occurs primarily at the server 11 or another remote device, which can be referred to as the remote analysis embodiments. Hybrid embodiments can include a combination of data analysis at the network device 12 and the server 11.

Regarding the local analysis embodiments, the network device 12 receives data collected at appliance X and performs an analysis of the data to generate a command for appliance Y. The analysis can include determining an identity of the user of appliance X, a temporary state of the user of appliance X, or a command from the user of appliance X. An example identity of the user can include an identifier for the user (e.g., username, user number, user code). An example temporary state of the user can include drowsiness, complexion, sickness, or mood. An example command from the user can turn on appliance Y or change a setting for appliance Y.

Regarding the remote analysis embodiments, the network device 12 can package or pre-process the data in a predetermined format and transmit the data to the server 11. The network device 12 can filter the data according to type. Example types include, but are not limited to audio data, image data, position data, biometric data, ambient data, or other types. The network device 12 can select a particular type of data to send to the server 11 based on the types of appliances associated with the network device 12. That is, the network device 12 can sort and select data collected at appliance X, for use with appliance Y, according to the capabilities or configuration of appliance Y, and send the selected data to server 11. In turn, the server 11 sends the selected data to appliance Y in response to the capabilities or configuration of appliance Y.

For image data, the network device 12 can analyze an image of at least a portion of the user. For position data, the network device 12 can determine a position of the user through analysis of the image (e.g., pattern matching or line detection) and/or through distance based sensors based on proximity. For biometric data, the network device 12 can collect temperature data (e.g., heat signature) from a temperature sensor or infrared sensor, fingerprint data from a fingerprint scanner/sensor, and/or eye data from a retina scanner. For ambient data, the network device 12 can collect temperature, humidity, and/or other environmental information.

The network device 12 can package the data in a predetermined format and transmit the data to the server 11. The predetermined format can be specific to the type of data (e.g., a particular file format). In one example, the collected data includes voice commands and the predetermined format is an audio file, such as an audio encoding format (e.g., Moving Picture Experts Group (MPEG) standard, MPEG-2, mp3, wave file or other format).

In addition to being encoded in a particular audio format, the recorded audio can include a predetermined syntax. The voice commands can include any combination of summons commands, request commands, device function commands, a skill command, and/or other commands.

The summons command can include a trigger word or voxel to address the home hub communication device. The trigger word can include a user specified name for the home hub communication device or a brand name for the home hub communication device or a generic name (e.g., hub or home hub) for the home hub communication device. For example, the trigger word can include a class of appliance or an associated room for the appliance. The skill command can include device identifiers and device functions. The device identifier includes a code or a word that describes the target device for the skill command. For example, predetermined syntax for the voice command can be [summons] [skill] or [summons] [device identifier] [device function]. For example, predetermined syntax for the voice command that specifies the brand of the appliance can be [summons] [brand] [skill] or [summons] [brand] [device identifier] [device function]. For example, predetermined syntax for the voice command that specifies the class of the appliance can be [summons] [bathroom] [skill] or [summons] [bathroom] [device identifier] [device function].

The device identifier can include multiple components, such as, for example, a component identifier and a sub-component identifier. The component identifier can describe any of the appliances described herein. The sub-component identifier can describe a portion of any such appliance. For example, for the component of a shower (e.g., shower 6), each shower sprayer is a sub-component, and for the component of a sink (e.g., sink 8), the hot and cold water valves can be a sub-component. The device function command can be a command to apply to the component and/or the sub-component. For example, for the component of a shower and shower sprayer a sub-component, the device function can include a level setting for the shower sprayer, and for the component of a sink, the device function can be the temperature defining a combination of the hot and cold levels.

The summons command can be omitted. For example, the predetermined format for the home hub communication device or the network device 12 can include a one-word theme control to communicate from one appliance to another appliance. For example, when the intelligent mirror system 3 receives a word indicative of a local appliance (e.g., lighting, temperature, sound, etc.) the following words are applied directly to that local appliance.

The appliances can communicate using a master and slave model. The master device can be defined as the device that directly communicates with the server 11 and receives voice commands from the user, and the slave device can be defined as the device that receives instructions from the server 11 in response to the voice commands routed to the server 11 through the master device. For example, the network device 12 can be the master device and one or more of the appliances and/or other components (e.g., camera, light, etc.) are slave devices.

A user proximity technique can be employed to dynamically change the master and slave status according to the presence of the user. For example, each appliance can detect its proximity to a user through a sensor (e.g., proximity sensor, other type), the detected proximity can be reported to the network device 12/server 11, and the network device 12/server 11 can assign a master status to the appliance with the closest proximity to the user. Other devices can be assigned a slave status. Thus, the master status changes dynamically. As the user moves relative to the devices, the master status is updated. For example, when the user moves from closest appliance X to closest appliance Y, the network device 12/server 11 changes the status of appliance X from master to slave and the status of appliance Y from slave to master.

In the master mode, one appliance can be configured to lead a group of appliances. For example, the master device is the only device that receives audio commands from the user, while audio commands to other appliances in the slave mode are ignored. Thus, the master mode enables a microphone of the master appliance, and the slave mode disables a microphone of a slave appliance. An appliance in master mode can issue instructions to one or more other appliances in slave mode.

In addition to exchanging information with each other, the appliances can exchange information with an external device 14 through the network device 12 and/or the server 11. The external device 14 can be associated with a manufacturer (e.g., the appliance manufacturer, the smartphone manufacturer).

The external device 14 can be configured to compile and analyze data connected by the appliances and shared through the network device 12 and/or the server 11. In one example, the network device 12 generates a report in response to the feedback data, and sends the report to the external device 14. The external device 14 can provide the user with service benefits in exchange for the shared data and/or can compile feedback data for multiple types of appliances and/or multiple locations for the appliances.

The manufacturer can collect data related to usage, maintenance, or malfunction from the external device 14. The usage data can describe when the user uses the appliance (e.g., a time of day or day of the week) and/or how the user uses the appliance (e.g., the shower door is closed, the water faucet is turned on). The external device 14 can calculate from the usage data how often and the duration a particular feature of an appliance is used. For example, the external device 14 can determine a number of seated users and a number of standing users that use a toilet (e.g., smart toilet 10). Features can be added or removed from a device based on the usage data. The maintenance data can describe when maintenance is applied to the appliance such as a consumable is replaced (e.g., water filter, seal, disinfectant solution) or when a maintenance provider visits the appliance. The malfunction data can include errors that are logged by the appliance. Such errors can include, but are not limited to electronic errors with the controller, water leaks or other plumbing errors, and/or communication errors with the network. The external device 14 can provide alerts to the user based on the collected data. Example alerts based on maintenance data can describe when a consumable should be reordered, and the external and/or network device 14, 12 can automatically reorder the consumable.

The network device 12 (e.g., a home hub communication device or appliance with integrated a home hub communication device) including a speaker and the external device 14 can coordinate to provide service assistance to the user. After diagnostics are performed at the external device 14 based on data collected at the appliances, the external device 14 provides feedback to the network device 12 in the form of announcement of a service call and/or scheduling, do-it-yourself instructions for the user to perform maintenance on the appliance, or error codes for the user to apply to the appliance or provide to a technician. The external device 14 can also send appropriate diagnostic routines, software upgrades, firmware upgrades and/or other local settings to the network device 12.

A collection of all the settings for the one or more of the appliances can be stored by the network device 12 or the server 11. The collection of settings can be a user passport that is transferrable to different locations through the server 11 (e.g., transferred to external device 14). The different locations can be different houses, hotels, or other rooms. In other words, the collection of settings for the appliances in FIG. 1 can be saved and stored in association with the user. When the user travels to another location such as a hotel room, the settings are provided on appliances at the other location. The external device 14 can access the user passport based on user identity such as a credit card, communication with the user's phone, a detection of the user's entity, and/or a code directly entered at the other location.

Figure 2:
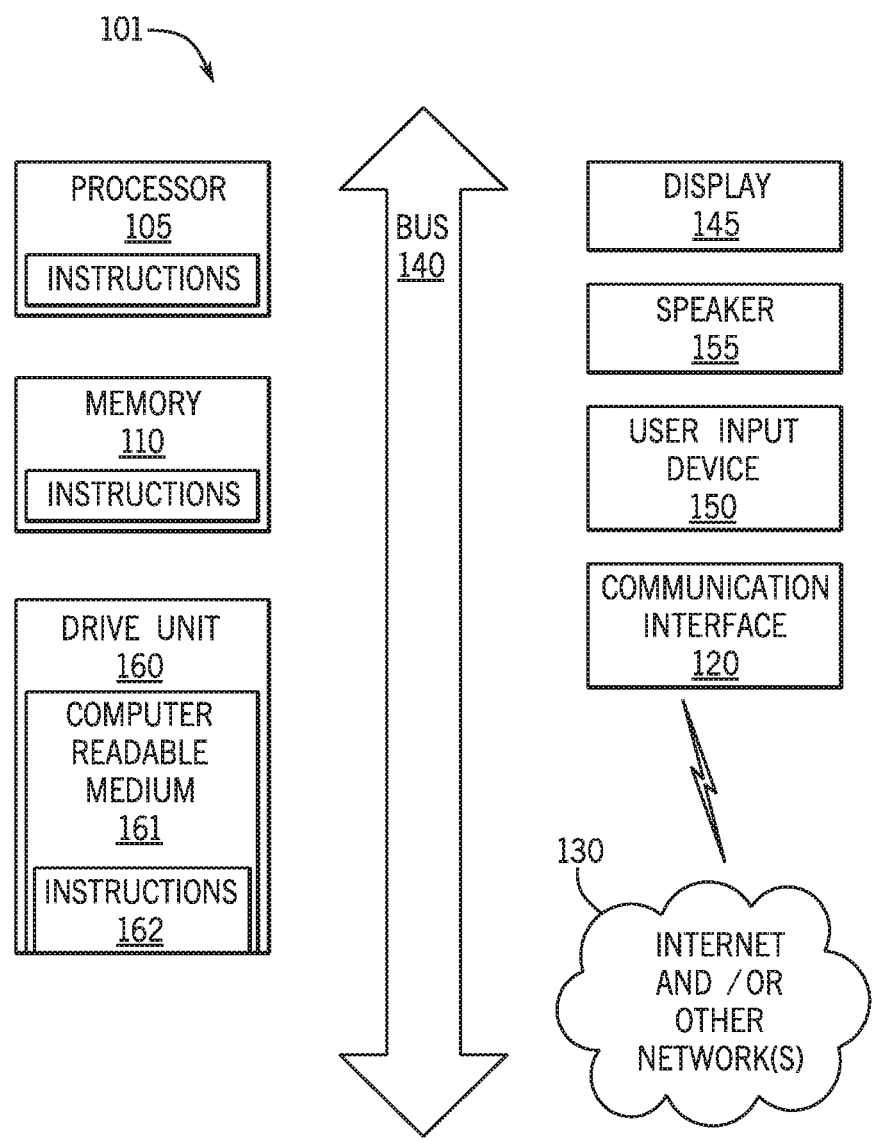
FIG. 2 is a schematic of an example of a communication network for the sets of appliances shown in FIG. 1.

FIG. 2 illustrates an exemplary embodiment of a control system 101 for the appliances and/or the home hub communication device. The control system 101 can be implemented by any of the appliances in FIG. 1, the network device 12, and/or the server 11. The control system 101 can include a processor 105, a memory 110, and a communication interface 120 for interfacing with devices (e.g., appliances, network device 12, or server 11, etc.) or to the internet and/or other networks 130. The components of the control system 101 can communicate using bus 140. The control system 101 can be connected to a workstation or another external device (e.g., control panel) and/or a database (e.g., lookup database) for receiving user inputs, system characteristics, and any of the values described herein. Optionally, the control system 101 can include a user input device 150 and/or a sensing circuit in communication with one or more sensors. The sensing circuit receives input/information from the one or more sensors described herein. Optionally, the control system 101 can include a drive unit 160 for receiving and reading non-transitory computer media 161 having instructions 162. The control system 101 can include additional, different, or fewer components than illustrated. The processor 105 is configured to perform instructions stored in memory 110 for executing the algorithms described herein.

The processor 105 can be or include a general purpose or specific purpose processor, an application specific integrated circuit (ASIC), one or more programmable logic controllers (PLCs), one or more field programmable gate arrays (FPGAs), a group of processing components, or other suitable processing components. The processor 105 is configured to execute computer code and/or instructions stored in memory 110 or received from other computer readable media (e.g., embedded flash memory, local hard disk storage, local ROM, network storage, a remote server, etc.). The processor 105 can be a single device or combination of multiple devices, such as associated with a network, distributed processing, or cloud computing.

The memory 110 can include one or more devices (e.g., memory units, memory devices, storage devices, etc.) for storing data and/or computer code for completing and/or facilitating the various processes described in the present disclosure. The memory 110 can include random access memory (RAM), read-only memory (ROM), hard drive storage, temporary storage, non-volatile memory, flash memory, optical memory, or any other suitable memory for storing software objects and/or computer instructions. The memory 110 can include database components, object code components, script components, or any other type of information structure for supporting the various activities and information structures described in the present disclosure. The memory 110 can be communicably connected to the processor 105 via a processing circuit and can include computer code for executing (e.g., by the processor 105) one or more processes described herein. For example, the memory 110 can include graphics, web pages, HTML files, XML files, script code, shower configuration files, or other resources for use in generating graphical user interfaces for display (e.g., on a display 145) and/or for use in interpreting user interface inputs to make command, control, or communication decisions.

In addition to ingress ports and egress ports, the communication interface 120 can include any operable connection. An operable connection can be one in which signals, physical communications, and/or logical communications can be sent and/or received. An operable connection can include a physical interface, an electrical interface, and/or a data interface. The communication interface 120 can be connected to a network. The network can include wired networks (e.g., Ethernet), wireless networks, or combinations thereof. The wireless network can be a cellular telephone network, an 802.11, 802.16, 802.20, or WiMAX network, a Bluetooth pairing of devices, or a Bluetooth mesh network. Further, the network can be a public network, such as the Internet, a private network, such as an intranet, or combinations thereof, and can utilize a variety of networking protocols now available or later developed including, but not limited to TCP/IP based networking protocols.

While the computer-readable medium 161 (e.g., the memory 110, drive unit 160, etc.) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. For example, the computer-readable medium can include a solid-state memory, such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is a tangible storage medium. Accordingly, the disclosure is considered to include any one or more of a computer-readable medium or a distribution medium and other equivalents and successor media, in which data or instructions can be stored. The computer-readable medium can be non-transitory, which includes all tangible computer-readable media.

It is noted that dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementation.

Wireless Magnetic Camera

Figure 7:
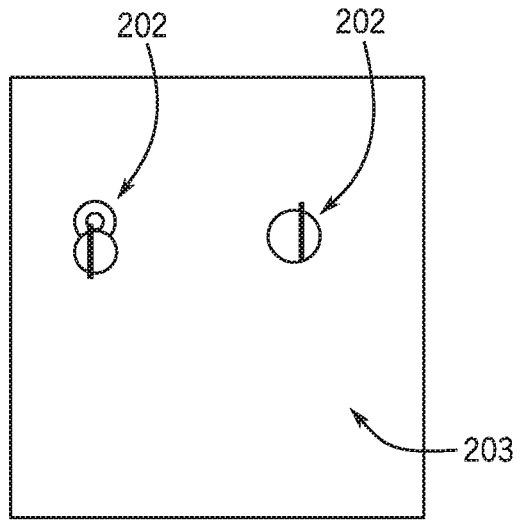
FIG. 7 is a front view of an exemplary embodiment of a mirror and a wireless magnetic camera with a rotatable shutter on the mirror.

FIGS. 3-10 illustrate exemplary embodiments of wireless magnetic camera systems 2, 202 (e.g., cameras) for use with exemplary mirror systems 3, 203 (e.g., mirrors). FIG. 3 shows two cameras 2 coupled to the mirror 3; and FIG. 7 shows two cameras 202 coupled to the mirror 203. Although it is noted that any number of cameras can be coupled to any mirror.

The camera 2 illustrated in FIGS. 4-6 includes a main body 20, a lens 21, a light 22 (e.g., light source), a shutter 23, and a controller 24. The illustrated main body 20 has a circular shape and extends between substantially parallel front and back surfaces 25, 26. Although, the main body 20 can have any suitable shape, such as a rectangular shape or diamond-shaped cross section shape, and the main body 20 can be made of or include any suitable material (e.g., plastic, metal, etc.). As shown, the camera 2 has a magnet 27 disposed on the back surface 26 of the main body 20. The magnet 27 can be integrally formed with or formed separately and coupled to the main body 20 (e.g., the back surface 26). The magnet 27 enables the camera 2 to be removably coupled to components having ferromagnetic material/properties, such as the mirror 3. In this way, the front surface 25 of the camera 2 can face outward from the mirror 3, such that a user can capture photos while facing the mirror 3 without holding the camera 2. Further, the magnetic coupling allows the camera 2 to be removably coupled to the mirror 3 such as when in use, and allows the camera 2 to be removed from the mirror 3 when not in use (e.g., to be stored) or for use elsewhere.

The illustrated main body 20 houses the lens 21, the light 22, the controller 24, and a power source 29 of the camera 2. The power source 29 can be or include a battery or other device that provides electric power to the camera 2. The power source 29 can plug into an electric outlet/cord to received electric power.

The lens 21 of the camera 2 captures light to enable the camera 2 to take photos and is shown disposed generally in the center of the main body 20. The lens 21 can be disposed behind the front surface 25, which can, for example, be made of include a clear, transparent material (e.g., glass, plastic, etc.) to protect the lens 21, while allowing a clear and unobstructed view.

The light 22 of the camera 2 is located proximate the lens 21 to produce light with varied luminous intensity depending on the lighting conditions in which the camera 2 is located. As shown in FIG. 6, the light 22 is disposed generally above the lens 21. The light 22 can operate as a flash, a strobe light, or constant light, which can be controlled through the controller 24, such as to enable a user to set the light mode through, for example, an external device 14 or other device (e.g., wireless device). In this way, the user can optionally choose to turn the flash on or off for capturing photos. The illustrated light 22 is disposed behind the generally transparent front surface 25.

The shutter 23 of the camera 2, which can control the amount of time that the imaging medium is exposed to the light (e.g., the light 22), is shown coupled to the front surface 25 of the main body 20. The shutter 23 can be made of or include any material (e.g., plastic, metal, etc.) such as to protect the front surface 25 of the camera 2, and also can be used to prevent inadvertent capturing of photos by removably obstructing the view of the lens 21. The illustrated shutter 23 has a shape that complements that of the main body 20. In other words, when the shutter 23 is in a closed position, the shutter can substantially match the configuration (e.g., shape, size, etc.) of the main body 20.

The shutter 23 engages (e.g., slideably, rotatably) with the front surface 25, so that the shutter 23 can move between an open position and the closed position relative to the front surface 25. The shutter 23 of the camera 2, which is illustrated in FIGS. 4-6, is slideably coupled to the front surface 25 of the main body 20. Specifically, the shutter is affixed to the main body 20 by way of a slideable coupling or engagement, which allows the shutter 23 to slide (e.g., linearly) into different positions relative to the lens 21. In the open position, the shutter 23 does not obstruct the view of the lens 21 of the camera 2. In other words, when the shutter 23 is in an open position, the camera 2 can capture a photo with the lens 21 completely unobstructed by the shutter 23. FIG. 6 shows the open position of the shutter 23, which is vertically down from the closed position shown in FIG. 4. In the closed position, the shutter 23 completely obstructs the lens 21 (i.e., the view of the lens 21), such as by completely covering the lens 21 and the front surface 25 of the body 20.

Figure 8:
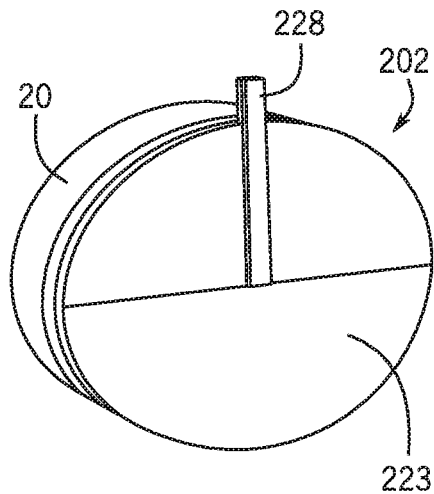
FIG. 8 is a perspective view of the wireless magnetic camera with the rotatable shutter shown in FIG. 7.
Figure 9:
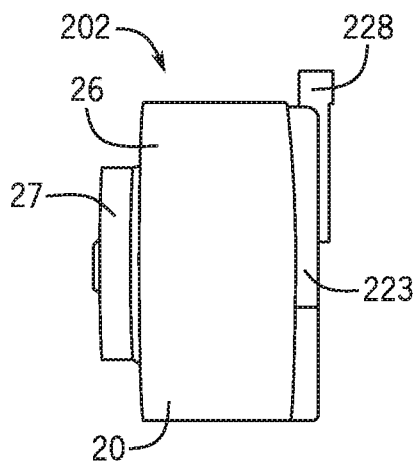
FIG. 9 is a side view of the wireless magnetic camera shown in FIG. 8 with the rotatable shutter in a closed position.
Figure 10:
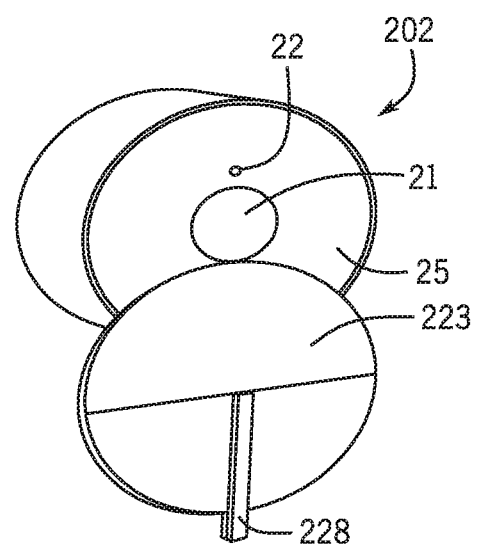
FIG. 10 is a perspective view of the wireless magnetic camera shown in FIG. 8 with the rotatable shutter in an open position.

FIGS. 8-10 illustrate an exemplary embodiment of a shutter 223 that is rotatably coupled to the body 20 the camera 202. The components and operation of the camera 202 are the same as the camera 2 (e.g., the light 22, lens 21, body 20, magnet 27, etc.), except where noted (e.g., the shutter 223). Thus, unlike the shutter 23, which slides linearly between the open and closed positions, the shutter 223 rotates about a pivot axis/point relative to the body 20 between an open position and a closed position. Like the shutter 23, the shutter 223 does not obstruct the lens 21 in the open position, but does obstruct the lens 21 in the closed position. The shutter 223 can be rotatably coupled to the front surface 25 or any part of the main body 20, so that the shutter 223 can rotate relative to the main body 20 about the pivot axis. As shown, the pivot axis is disposed below the lens 21; however, the pivot axis can be on any side of the lens 21. Further, the shutter can be configured to rotate about a pivot axis that is concentric with a circular body of the camera.

The shutter 223 can, optionally, include a rotation bar 228. The illustrated shutter 223 is circular and the illustrated rotation bar 228 extends radially outward from an approximate center of the shutter 223. The rotation bar 228 can extend proud (i.e., forward of) the front-forward facing surface of the shutter 223 and/or radially beyond the outer perimeter of the shutter 223. As shown in FIGS. 8 and 9, the rotation bar 228 extends vertically above a top of the shutter 223 and a top of the main body 20 in the closed position. The rotation bar 228 aids a user in rotating the shutter 223 between the open and closed positions. The rotation bar 228 can be made of any material, which can be the same or different as the material(s) of the shutter 223. The shutter 223 obstructs the view of the lens 21 in the closed position by overlaying the main body 20, such that the front surface 25 of the main body 20 is directly behind the shutter 223. Upon rotation of the shutter 23 about the pivot axis to the open position, the shutter 223 does not obstruct the view of the lens 21. A user can rotate the shutter 223 relative to the main body 20 by applying a force to the rotation bar 228, which in-turn rotates the shutter 223 fixedly coupled to the rotation bar 228. In the illustrated configuration (i.e., where the pivot point is disposed below the lens 21), the shutter 223 is disposed substantially vertically below the lens 21 in the open position (FIG. 10).

The camera 202 can include a controller (e.g., the controller 24 shown in FIG. 4) disposed within the main body 20. The controller 24 controls the function(s) of the camera 2, 202. For example, the controller 24 can include a communications module that transmits and receives information with an external device 14, such as to control the camera 2, 202 through a mobile application on the device. The communications module can enable the camera with Wi-Fi or Bluetooth connectivity, such that a user can electronically communicate with the camera 2, 202 from, for example, a wireless telephone. Thus, a user can connect to and control the camera 2, 202 through a mobile application. The controller 24 can communicate with the communication network 100. In this way, the camera 2 can communicate with other devices that are communicably coupled to the communication network 100.

The cameras disclosed herein (e.g., camera 2, camera 202, etc.) can be configured to capture photos and/or videos. A user can control operation of the camera (e.g., taking pictures/video) through, for example, a mobile application on a smartphone or tablet. For example, the mobile application can have a "capture" button which, after receiving a user input on the user interface of the wireless device, can wirelessly communicate to the camera 2 to capture the photo. Similarly, the user can provide an input to the user interface on the wireless device to start and/or stop capturing a video from the camera 2.

In one or more embodiments, the camera 2, 202 can include a manual trigger to activate the camera 2, 202. For example, the camera 2, 202 can include a button on the camera 2, which when pushed activates taking a photo/video. The camera 2, 202 can be configured to take a single photo or multiple photos each time the manual trigger is activated, as well as to begin recording a video in response to activation of the manual trigger a first time and then cease recording in response to activation of the manual trigger a second time.

In one or more embodiments, the camera 2, 202 can, optionally, include a wire or cable that extends from the main body 20 and that connects to a USB port, a lightning port, a micro-USB port, or another port/connection of a device. In this way, the camera 2, 202 can communicate with the communication network 100 via a wired connection to other devices.

Each camera 2, 202 provides convenience and utility while maintaining privacy. For example, a user can completely close the shutter 23 and/or remove the camera 2, 202 from the mirror 3 or other object coupled to and store it away in a drawer when not in use or to provide privacy or more secure, such as by reducing the chance of inadvertently capturing photos.

Further, the magnet 27 advantageously improves the versatility (e.g., mobility/coupling) of the camera 2, 202 by allowing the camera 2, 202 to be affixed to an object having a ferromagnetic element. In this way, the height of the camera 2, 202 can easily be repositioned on other objections (e.g., the mirror 3) to enable the user to capture photos at their desired height or angle, and the camera 2, 202 can be moved from room to room or place to place easily. Additionally, the camera 2, 202 allows for full-length photos, or, when capturing a video, the user can, for example, capture 360 degree views of an outfit. Additionally, the controller 24 of the camera 2, 202 enables connectivity to other devices, such as a wireless device, and operation of the camera 2, 202 by such other devices, which can streamline the process of uploading or sharing photos captured by the camera 2, 202 to other devices or applications wirelessly.

Intelligent Mirror

Figure 11:
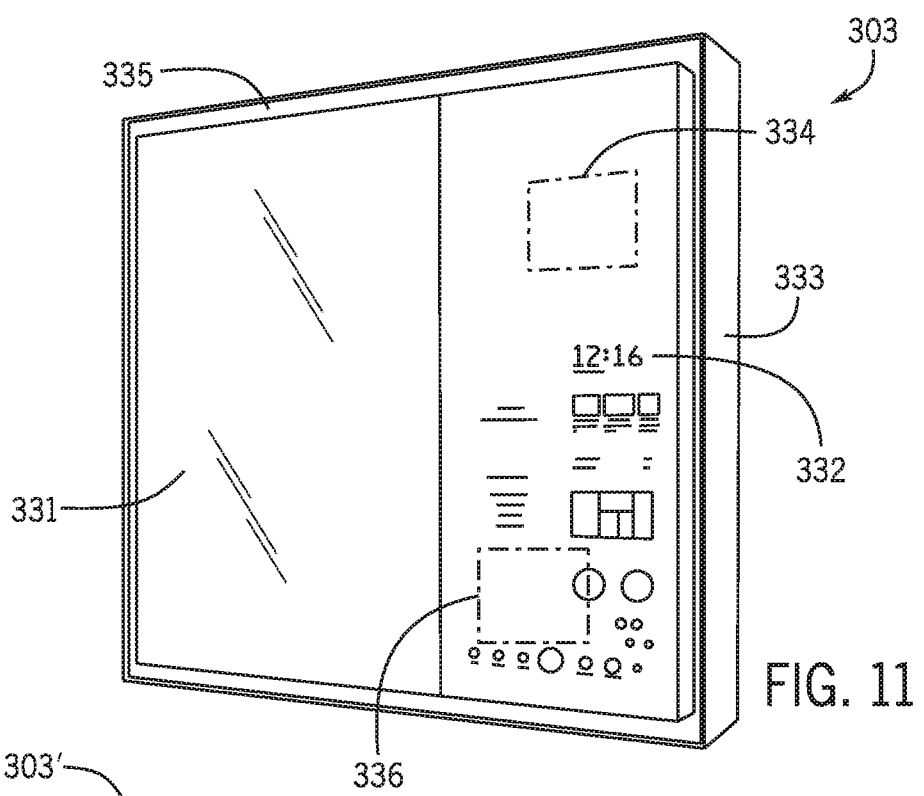
FIG. 11 is a perspective view of an exemplary embodiment of an intelligent mirror.
Figure 12:
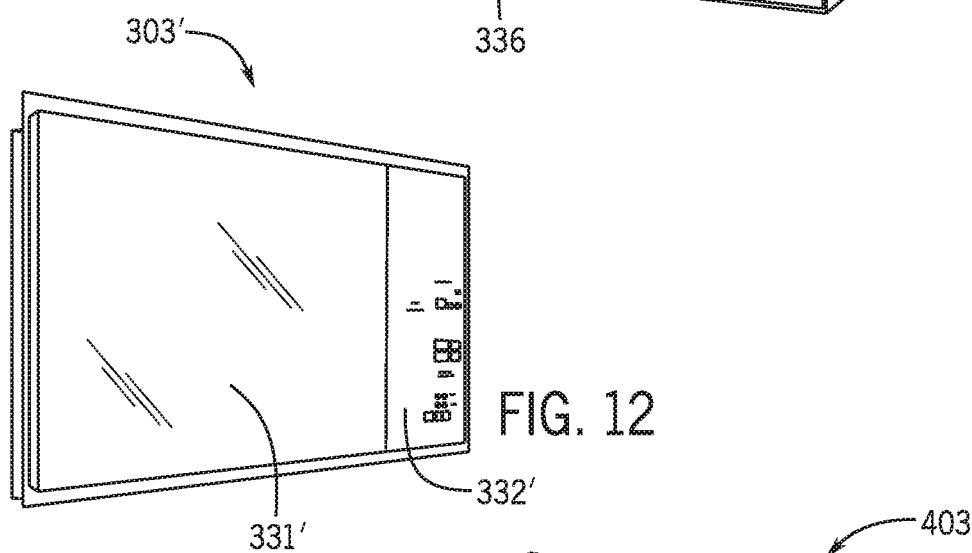
FIG. 12 is a perspective view of an exemplary embodiment of an intelligent mirror having a large mirror substrate.

The mirrors 3, 203 illustrated in FIGS. 3 and 7, respectively, can be conventional mirrors or intelligent mirrors, such as those disclosed herein. One such intelligent mirror 303 is illustrated in FIG. 11 having a mirror or mirrored substrate or surface 331, a user interface 332, a structure or cabinet 333, and a controller 334. The mirror surface 331 provides a reflection to a user and can be made from or include any suitable mirror material (e.g., polished material, transparent glass that is coated with a thin layer of reflective metal, such as silver or aluminum, etc.). The size of various elements of the mirror can be varied. By way of example, the mirror surface 331 of the mirror 303 shown in FIG. 11 is approximately one to two times the size (e.g., width) of the user interface 332, whereas the mirror surface 331' of the mirror 303' shown in FIG. 12 is greater than twice the size of the user interface 332'.

The user interface 332 of the mirror 303 allows a user to input information into and/or receive information from the mirror 303 and/or other devices (e.g., camera, sink, etc.) connected to the mirror 303, such as through the network. The user interface 332 can include a display that outputs information (e.g., pictures, video, texts, email, phone calls, calendar, time, date, local weather, music, news, alarm, "to-dos", etc.). The outputted information can be from an internal memory (e.g., memory 110) or from a memory of an external device 14 in communication through the network 13. The user interface 332 can include a touchscreen (e.g., capacitive touchscreen) that can receive a user input to control functionality of the mirror (e.g., lighting, camera, the display or features thereof, etc.).

The cabinet 333 of the mirror 303 generally facilitates mounting the mirror, such as to a wall or other object, as well as housing one or more of the other components of the mirror 303. The illustrated cabinet 333 has a top, bottom, right side, and left side to form a frame around the mirror surface 331 and the user interface 332. The cabinet 333 can include other elements, such as internal shelves and/or hinges for rotatably coupling the mirror surface 331 and/or user interface 332 to the cabinet 333. The cabinet 333 can support/be coupled to other components of the mirror 303, such as the controller 334.

The mirror 303 can, optionally, include a light bar 335 and a home hub communication device 336. Although, the light bar 335 is shown disposed above the mirror surface 331, the light bar 335 can be located elsewhere on the mirror 303 (e.g., a side, the bottom, between the mirror surface 331 and the user interface 332, etc.). The home hub communication device 336 can enable the mirror 303 to communicate with other devices that are connected to a communication network (e.g., the network 100), and/or with the internet.

Figure 13:
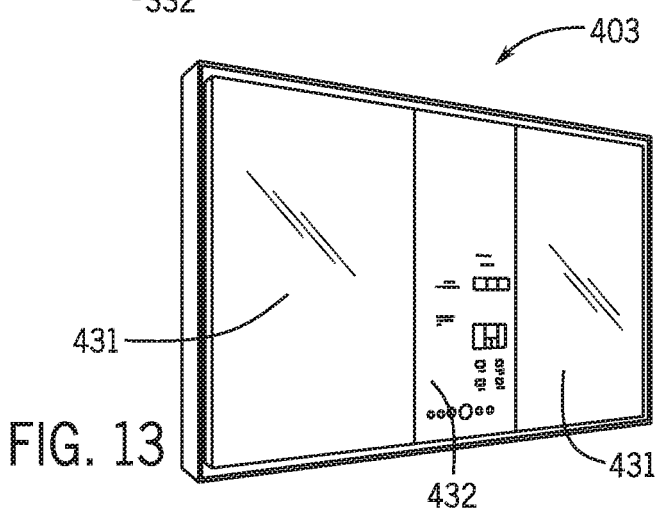
FIG. 13 is a perspective view of an exemplary embodiment of an intelligent mirror having two mirror substrates.

FIG. 13 illustrates an exemplary embodiment of an intelligent mirror 403 that includes two mirror surfaces 431 separated by an intervening user interface 432. Thus, a first (or left hand) mirror surface 431 is located to the left side of the user interface 432 and a second (or right hand) mirror surface 431 is located to the right side of the user interface 432. The size of each mirror surface 431 can be the same or different, depending on the application.

Figure 14:
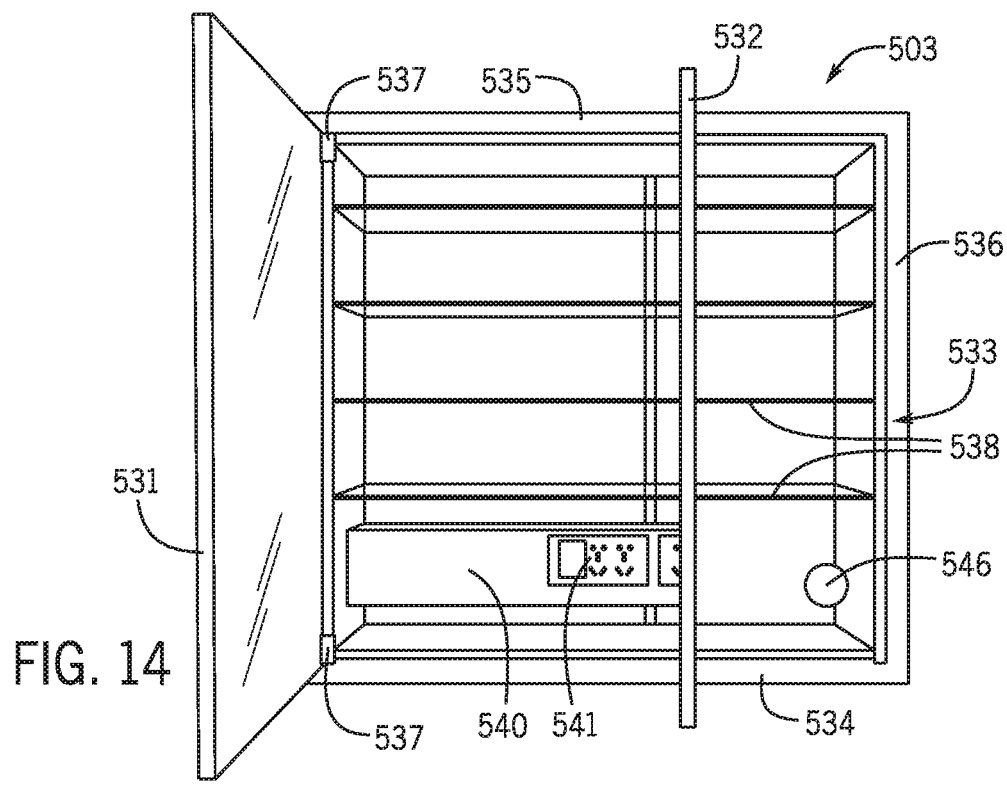
FIG. 14 is a perspective view of an exemplary embodiment of an intelligent mirror with the mirror open to show the features of a cabinet in greater detail.
Figure 15:
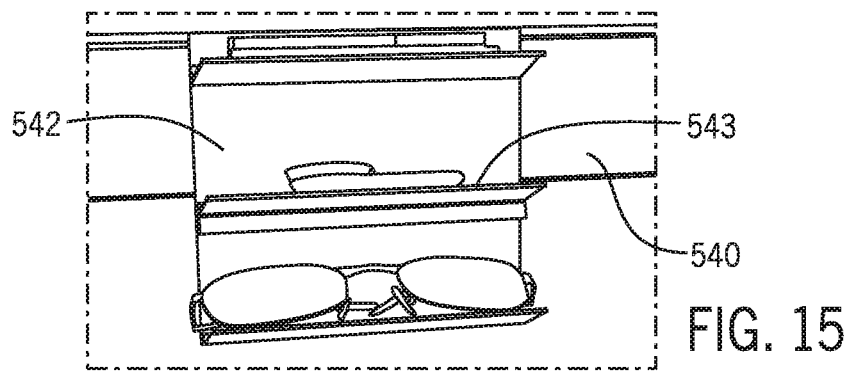
FIG. 15 is a perspective view of an exemplary embodiment of a magnetic shelf of the intelligent mirror.
Figure 16:
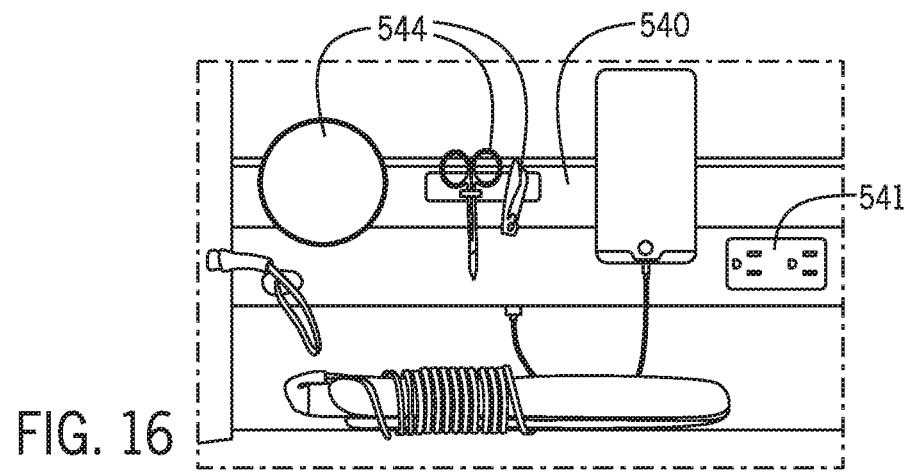
FIG. 16 is a perspective view of an exemplary embodiment of a magnetic bar and power source of an intelligent mirror.

FIGS. 14-16 illustrate an exemplary embodiment of a mirror system 503 having a cabinet 533, a mirrored door 531 (shown rotated to an open position relative to the cabinet 533 in FIG. 14), and a user interface 532 (shown rotated to an open position relative to the cabinet 533 in FIG. 14). The mirrored door 531, as shown, includes a mirrored surface on each side of the door 531 (i.e., an outside and an inside). The illustrated cabinet 533 includes a bottom 534, a top 535, and two sides 536 that form a generally rectangular frame. The mirrored door 531 is rotatably coupled to the frame through a first hinge 537 coupling a top of the door 531 to the top 535 of the cabinet 533 and a second hinge 537 coupling a bottom of the door 531 to the bottom 534 of the cabinet 533.

Also shown in FIG. 14, the cabinet 533 includes one or more horizontally extending shelves 538, a magnetic bar 540, and a power strip 541 (e.g., an electrical connection). The shelves 538 can be configured generally parallel to one another and can extend the full width of the cabinet 533 or any shorter width. Each shelf 538 can support toiletries (i.e., toothpaste, tooth brush, deodorant, etc.), medicine, or any other object on a top surface. The power strip 541 can include, for example, a GFCI outlet, a USB port, or any other suitable connection that can provide electric power to an electronic device (i.e., electric toothbrush, mobile device, etc.). The power strip 541 can receive electric power from internal batteries or an external source (e.g., main electricity for residential, commercial, or industrial buildings). As shown in FIGS. 15 and 16, the magnetic bar 540 can be used to detachably couple ferromagnetic objects, such as a metal hanger 542 having shelves 543 for supporting other objects (e.g., eyeglasses), a metallic mirror or personal grooming supplies shown as reference numeral 544 (e.g., scissors, tweezers, curling iron, etc.), as well as each camera 2, 202, such as when stored.

Figure 17:
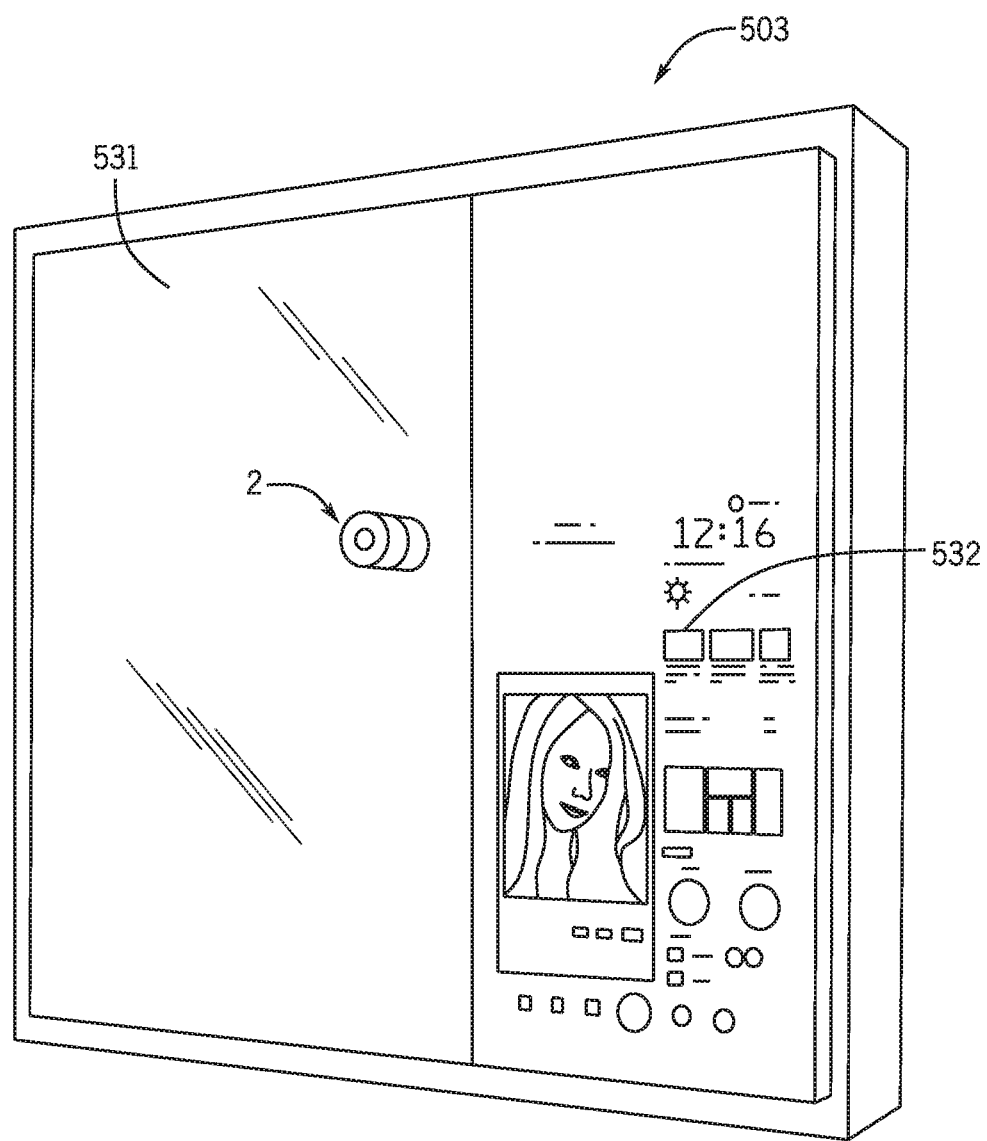
FIG. 17 is a perspective view of the mirror shown in FIG. 14 with a camera attached to a mirror surface thereof.

FIG. 17 illustrates the intelligent mirror 503 with a camera 2 coupled to the front (e.g., outside) mirrored surface of the mirrored door 531. The display of the user interface 532 is shown displaying an image taken from the camera 2, which can be displayed contemporaneously with being taken (i.e., a live image) or not (i.e., a previously taken photo).

The mirrors disclosed herein advantageously are modular to allow for customization for different applications/users. For example, the size, frame shape, lighting options, number of mirrors, number of user interfaces, relative locations of the mirror(s) and user interface(s), among many other aspects can be tailored to customize the mirror. Further, the various features of the mirrors can work independently or in concert to enhance the grooming experience. For example, a camera can sense the amount and type of light (e.g., through one or more sensors) and communicate with a controller, which can vary the luminous intensity (e.g., dim, brighten) as well as the type of light (e.g., warm white, natural white, daylight, etc.), such as by adjusting the light color temperature, to make it easier to, for example, put on make-up. Further, the controller and display can take a picture of the user and add make-up (different colors of lip-stick or foundation) showing the user how it would look, without the user having to put it on. Further, due to the mirror's connectivity, the mirror can find a tutorial on the internet to show you how to apply a new kind or style of make-up or how to tie a neck-tie or bow-tie, among other things. Also for example, the controller can activate a light to act as a night light in response to the camera detecting presence of a user during nighttime hours. Such a light can come out of a gap in the cabinet or between the cabinet and another object (e.g., inner frame and outer frame), such that light source is hidden (e.g., underneath a side of the mirror cabinet). Also for example, the controller can be responsive to voice controls, allowing a user to turn on the light or display some information through one or more voice controls.

The mirrors disclosed herein can also include sensors/scanners (e.g., biophotonic sensors, microscopes, etc.) that are configured to scan a user and analyze the skin condition of the user (e.g., hydration, melanin, etc.). The sensors/scanners can analyze other things as well, such as, but not limited to dark circles under/around the eyes, red/dark spots, fine lines/wrinkles, and roughness. The sensors/scanners can communicate to the display (e.g., through the controller) to inform the user of the skin condition analysis, such as to suggest moisturizing, make-up application, etc. Moreover, the mirrors can track the skin condition over time (i.e., to provide a history of such), which could indicate to the user whether a given treatment (e.g., moisturizing) is working or not.

Smart Button

A smart button can be provided with an intelligent mirror either integrated therewith or separate from, but connected thereto through a network (e.g., the network 13). As shown in FIG. 14, the smart button 546 can be wirelessly connected to the network, so that an activity is triggered in response to activation (e.g., depressing, pushing, etc.) of the button 546 by a user. For example, the smart button 546 can be a "panic" button that triggers an emergency response (e.g., police, security, etc.) in response to activation. However, the smart button 546 can be configured to communicate with other devices of the system/network in response to activation, such as to control other features/devices. The smart button can also be included on other intelligent devices, such as the automated bathtub 7, which can be used by, for example, the elderly in case of an emergency (e.g., a fall, trouble getting out of the bath, an intruder, etc.).

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database(s) (e.g., lookup database, etc.), database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The above description is intended to be explanatory and, therefore, is non-limiting in nature. It should be noted that other variations may be made by those skilled in the art based on the principle of the disclosure of this application, which shall also be encompassed by the scope of the present invention as recited in the claims.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the control systems/methods for toilets, bidets and the like, as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., module, switch, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A mirror system, comprising:
a mirrored surface including a ferromagnetic material;
a control system including a user interface that is configured to receive user input, wherein the user interface is coupled to the mirrored surface and includes a display disposed adjacent to the mirrored surface;
a frame coupled to the mirrored surface and the display; and
a camera comprising a front surface, a back surface, and a magnet coupled to the back surface, wherein the magnet is configured to removably couple the camera to the ferromagnetic material at any location along the mirrored surface, wherein the control system is communicably coupled to the camera and is configured to receive information from the camera and to display live images from the camera,
wherein the frame forms part of a cabinet,
wherein the minor is a mirrored door operatively coupled to the frame,
wherein the mirrored door is rotatably coupled to the cabinet, and wherein the display is rotatably coupled to the frame separately from the mirrored door.

2. The system of claim 1, wherein the camera further includes a main body, a lens disposed within the main body and configured to view objects in front of the front surface, and a shutter that is adjustably coupled to the main body, so that the shutter is movable relative to the lens between a closed position and an open position, wherein the shutter obstructs the view of the lens in the closed position, and the lens is at least partially unobstructed by the shutter in the open position.

3. The system of claim 2, wherein the shutter is rotatable about a pivot axis relative to the main body between the closed position and the open position.

4. The system of claim 3, wherein the camera further comprises a rotation bar coupled to the shutter, the rotation bar extending beyond the shutter in a radial direction and in a forward direction.

5. The system of claim 2, wherein the shutter slides relative to the main body between the closed position and the open position.

6. The system of claim 1, wherein the mirrored door is rotatably coupled to the frame through a hinge, the mirrored door includes an inner surface and an outer surface, and each of the inner and outer surfaces includes the ferromagnetic material so that the camera can be removably coupled to both the inner and outer surfaces through the magnet.

7. The system of claim 1, wherein the display is positioned alongside the mirrored surface, and wherein the frame extends around the mirrored surface and the display.

8. The system of claim 7, wherein the user interface includes a touchscreen for inputting commands received by the control system of the user interface to control operation of the camera through the user interface.

9. The system of claim 2, wherein the shutter obstructs the view of the lens in the closed position, the lens is at least partially unobstructed by the shutter in the open position, the shutter is rotatable about a pivot axis relative to the main body between the closed position and the open position, the camera further comprises a rotation bar coupled to the shutter, and the rotation bar extends beyond the shutter in a radial direction and in a forward direction.

10. The system of claim 2, wherein the shutter obstructs the view of the lens in the closed position, the lens is at least partially unobstructed by the shutter in the open position, and the shutter slides relative to the main body between the closed position and the open position.

11. The system of claim 1, further comprising a communication network configured so that the camera communicates wirelessly with the control system.

12. The system of claim 11, further comprising:
at least one of an automated toilet, an automated shower, an automated bathtub, and an automated sink;
wherein the control system communicates with the at least one of the automated toilet, the automated shower, the automated bathtub, and the automated sink through the communication network;
wherein the control system comprises:
a processor; and
a communication interface configured to wirelessly receive instructions from the processor in response to the user input and in turn output instructions to the at least one of the automated toilet, the automated shower, the automated bathtub, and the automated sink.

13. The system of claim 12, further comprising an external device having a mobile application that can wirelessly control operation of the minor and the at least one of the automated toilet, the automated shower, the automated bathtub, and the automated sink through an internet and the control system.

14. The system of claim 12, further comprising an external device having a mobile application that can wirelessly control operation of the minor through a communication interface.

15. The system of claim 13, wherein the communication interface is configured to receive data from a memory, and wherein the data includes facial features of a user.

16. The system of claim 1, wherein the control system is configured to compare an image captured by the camera to facial features of a user stored in a memory of the control system to identity the user, wherein the facial features of the user stored in the memory were input into the memory by a processor of the control system communicating with the camera through a communication interface of the control system.

17. The system of claim 1, wherein the control system is configured to compare an image captured by the camera to facial features of a user stored in a memory of the control system to identity the user, wherein the facial features of the user stored in the memory were input into the memory by a processor of the control system communicating with a smartphone.

18. The system of claim 1, further comprising a lighting module, wherein the control system is configured to receive at least one of an amount of light or an intensity of light from the camera, and wherein the control system is configured to control the lighting module in response to the amount of light or the intensity of light.

19. A mirror system, comprising:
a mirrored surface;
a ferromagnetic material;
a control system including a user interface that is configured to receive user input, wherein the user interface is coupled to the mirrored surface and includes a display disposed adjacent to the mirrored surface;
a frame coupled to the mirrored surface and the display; and
a camera comprising a front surface, a back surface, and a magnet coupled to the back surface, wherein the magnet is configured to removably couple the camera to the ferromagnetic material at any location along the mirrored surface, wherein the control system is communicably coupled to the camera and is configured to receive information from the camera and to display live images from the camera,
wherein the frame forms part of a cabinet;
wherein the minor is a mirrored door operatively coupled to the frame,
wherein the mirrored door is rotatably coupled to the cabinet, and wherein the display is rotatably coupled to the frame separately from the mirrored door.

20. A mirror system, comprising:
a control system including a user interface that is configured to receive user input, wherein the user interface is coupled to a mirrored surface and includes a display disposed adjacent to the mirrored surface;
a frame coupled to the mirrored surface and the display; and
a camera comprising a front surface, a back surface, and a magnet coupled to the back surface, wherein the magnet is configured to removably couple the camera to a location along the mirrored surface, wherein the control system is communicably coupled to the camera and is configured to receive information from the camera and to display live images from the camera,
wherein the frame forms part of a cabinet;
wherein the minor is a mirrored door operatively coupled to the cabinet,
wherein the mirrored door is rotatably coupled to the frame, and wherein the display is rotatably coupled to the frame separately from the mirrored door.

* * * * *